(12) United States Patent
Clinton et al.

(10) Patent No.: US 8,463,884 B2
(45) Date of Patent: Jun. 11, 2013

(54) SYNCHRONIZATION OF MOBILE DEVICE WITH APPLICATION SERVER

(75) Inventors: Nathaniel Clinton, Sammamish, WA (US); John Bruno, Snoqualmie, WA (US); Michael Christopher Connolly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 988 days.

(21) Appl. No.: 12/420,420

(22) Filed: Apr. 8, 2009

(65) Prior Publication Data

US 2010/0262958 A1 Oct. 14, 2010

(51) Int. Cl.
*G06F 15/177* (2006.01)
*G06F 9/44* (2006.01)

(52) U.S. Cl.
USPC .......................................... 709/221; 717/171

(58) Field of Classification Search
USPC .................................. 709/221; 717/171–173
See application file for complete search history.

(56) References Cited

U.S. PATENT DOCUMENTS

| | | | |
|---|---|---|---|
| 6,128,656 A | 10/2000 | Matchefts et al. | |
| 6,330,600 B1 | 12/2001 | Matchefts et al. | |
| 6,480,901 B1 | 11/2002 | Weber et al. | |
| 6,725,262 B1 | 4/2004 | Choquier et al. | |
| 6,917,933 B2 | 7/2005 | Craig et al. | |
| 7,020,696 B1 | 3/2006 | Perry et al. | |
| 7,127,460 B2 | 10/2006 | Nixon et al. | |
| 7,451,176 B2 | 11/2008 | Anders et al. | |
| 2004/0198447 A1* | 10/2004 | Larsson ........................ | 455/558 |
| 2005/0044401 A1* | 2/2005 | Morrow et al. ............... | 713/200 |
| 2006/0106806 A1* | 5/2006 | Sperling et al. ................ | 707/10 |
| 2008/0065816 A1* | 3/2008 | Seo ............................... | 711/103 |
| 2008/0076401 A1* | 3/2008 | Zeilingold et al. ............ | 455/418 |
| 2008/0113656 A1* | 5/2008 | Lee et al. .................... | 455/414.3 |
| 2008/0313313 A1 | 12/2008 | Doshi et al. | |
| 2009/0222811 A1* | 9/2009 | Faus et al. ..................... | 717/173 |
| 2009/0305687 A1* | 12/2009 | Baldan .......................... | 455/419 |
| 2010/0004950 A1* | 1/2010 | Bajko et al. ........................ | 705/3 |
| 2010/0162232 A1* | 6/2010 | Bhatia et al. .................. | 717/178 |

FOREIGN PATENT DOCUMENTS

WO WO 2007062673 A1 * 6/2007

OTHER PUBLICATIONS

"ManageEngine DeviceExpert(Network Configuration Management) 5.1", retrieved at <<http://www.softsia.com/ManageEngine-DeviceExpert-Network-Configuration-Management-download-y3kg.htm>>, May 21, 2008, p. 1.
Isard, Michael., "Autopilot: Automatic Data Center Management", ACM SIGOPS Operating Systems Review, retrieved at <<http://delivery.acm.org/10.1145/1250000/1243426/p60-isard.pdf?key1=1243426&key2=7919463321&coll=GUIDE&dl=GUIDE&CFID=20786653&CFTOKEN=37839985>>, vol. 41, No. 2, Apr. 2007, pp. 60-67.

* cited by examiner

*Primary Examiner* — Jeong S Park
(74) *Attorney, Agent, or Firm* — Alleman Hall McCoy Russell & Tuttle LLP

(57) ABSTRACT

Embodiments related to synchronizing a state of a mobile device with a state stored of a mobile device application server are disclosed. One embodiment provides a method of synchronizing a state on a mobile device and a state on a mobile device application server comprising receiving a state change at the application server that changes a state relative to a state stored on one or more mobile devices, and storing the state change. Next, the method comprises receiving a request from a mobile device for information regarding any state changes that have occurred, sending a response notifying the mobile device of the state change, receiving from the mobile device an application manifest that gives a current state of the mobile device, updating the application manifest to form an updated application manifest that reflects the state change, and sending the updated application manifest to the mobile device.

18 Claims, 4 Drawing Sheets

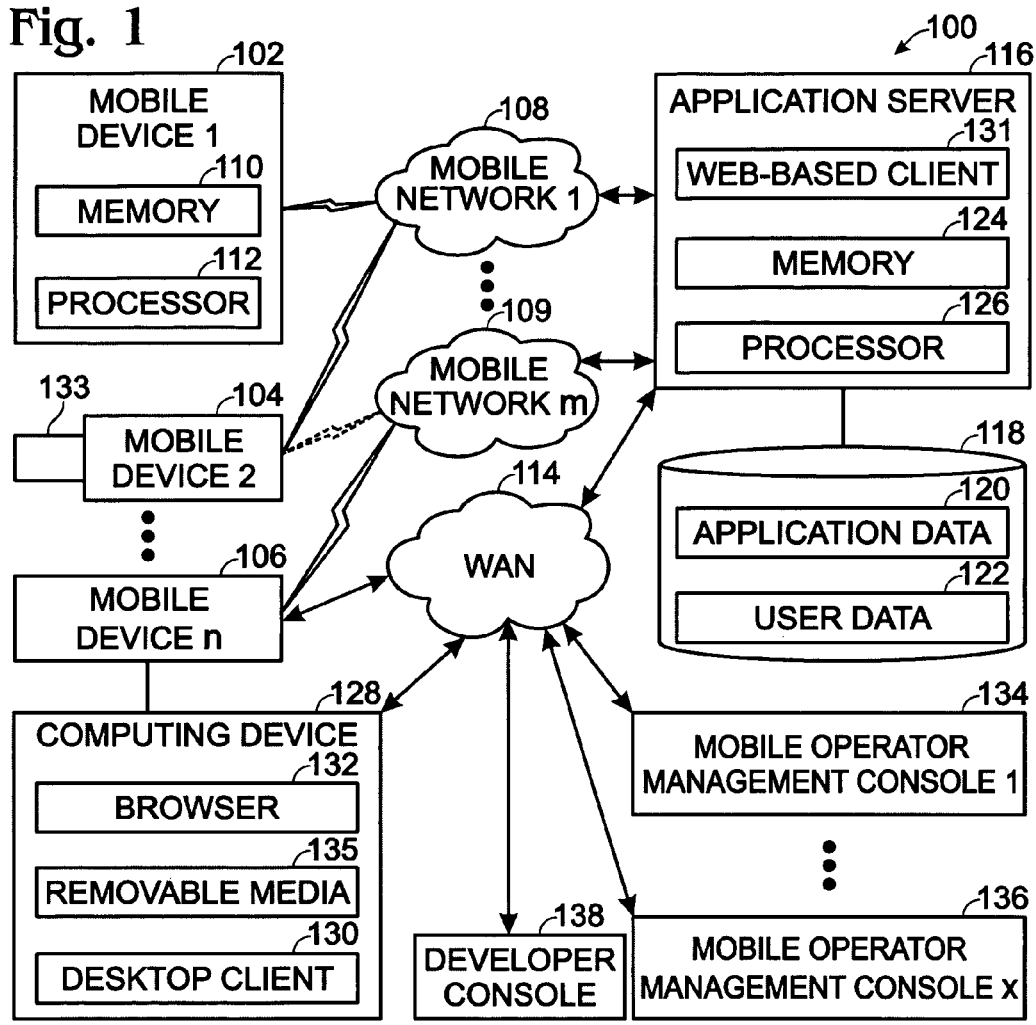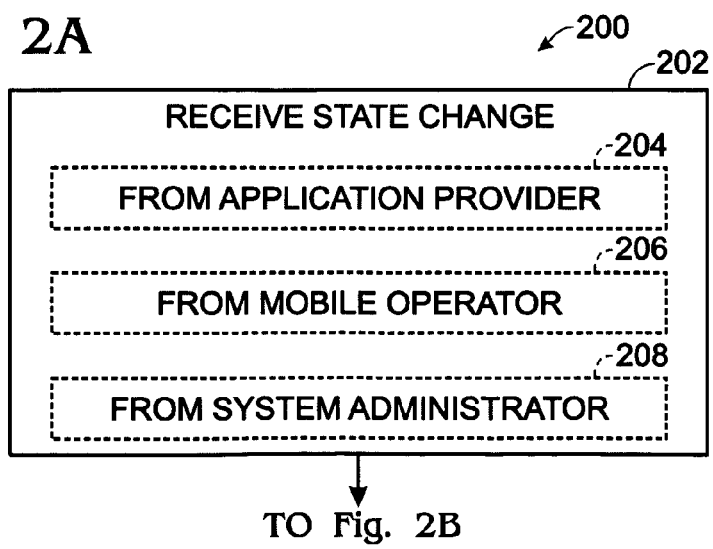

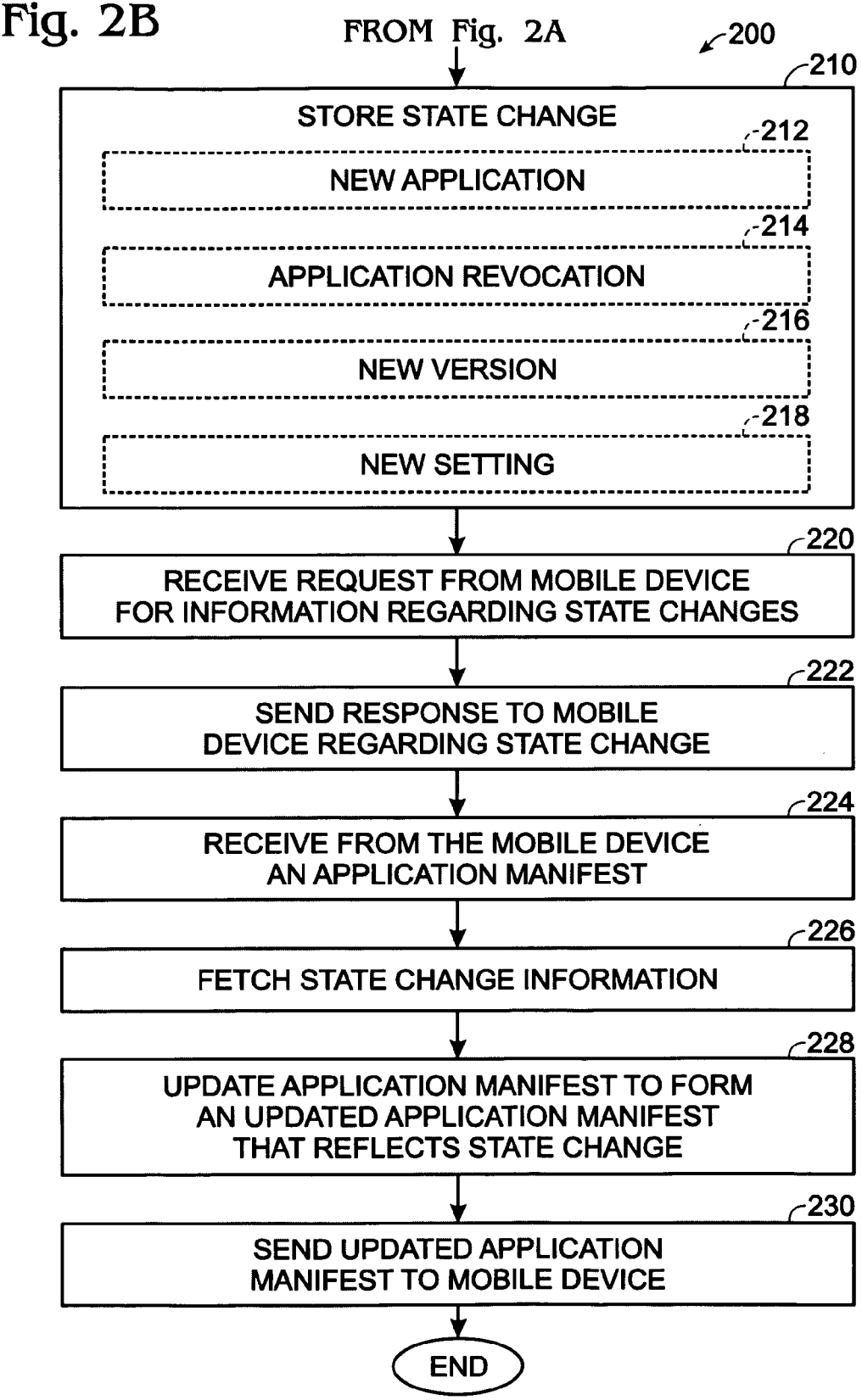

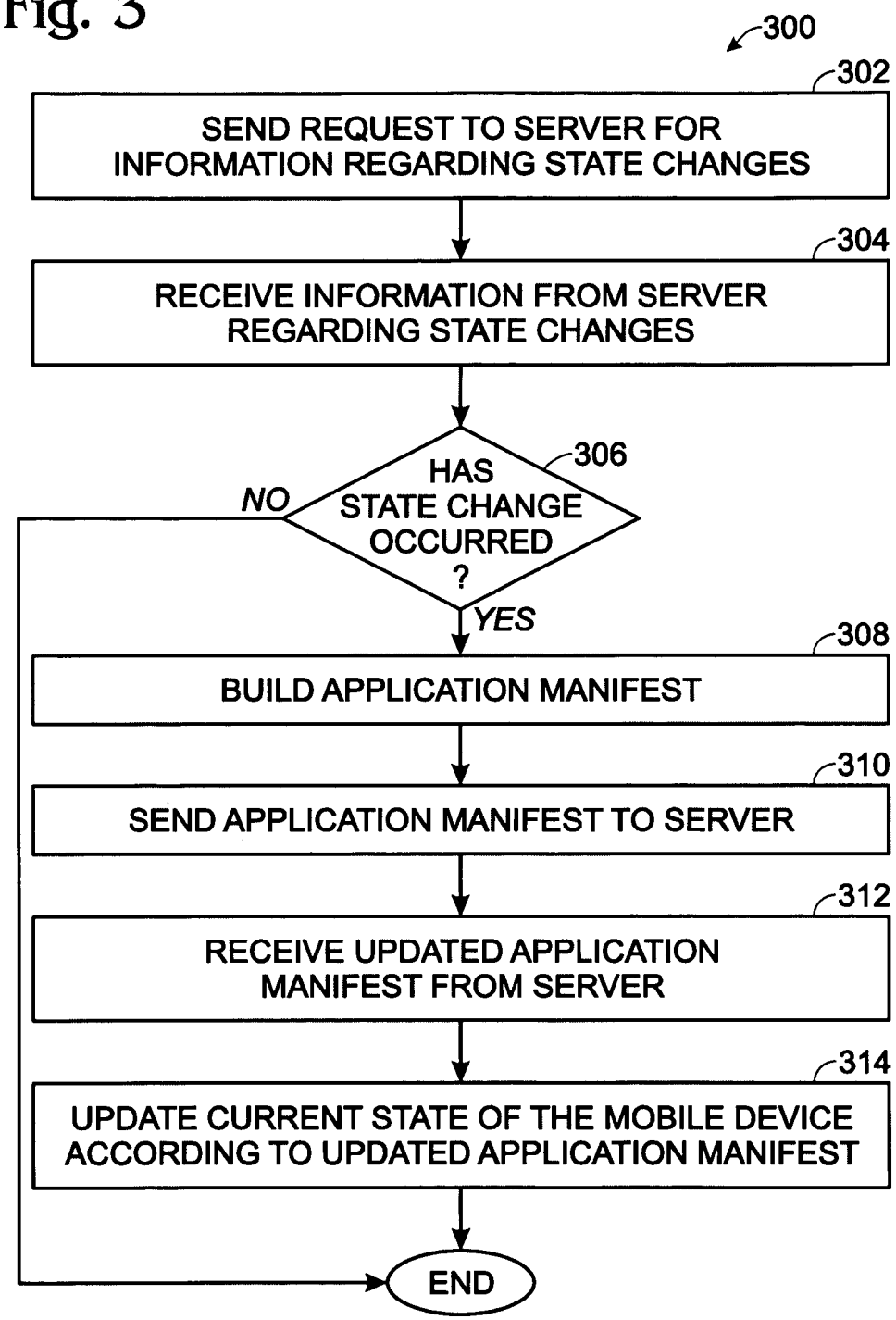

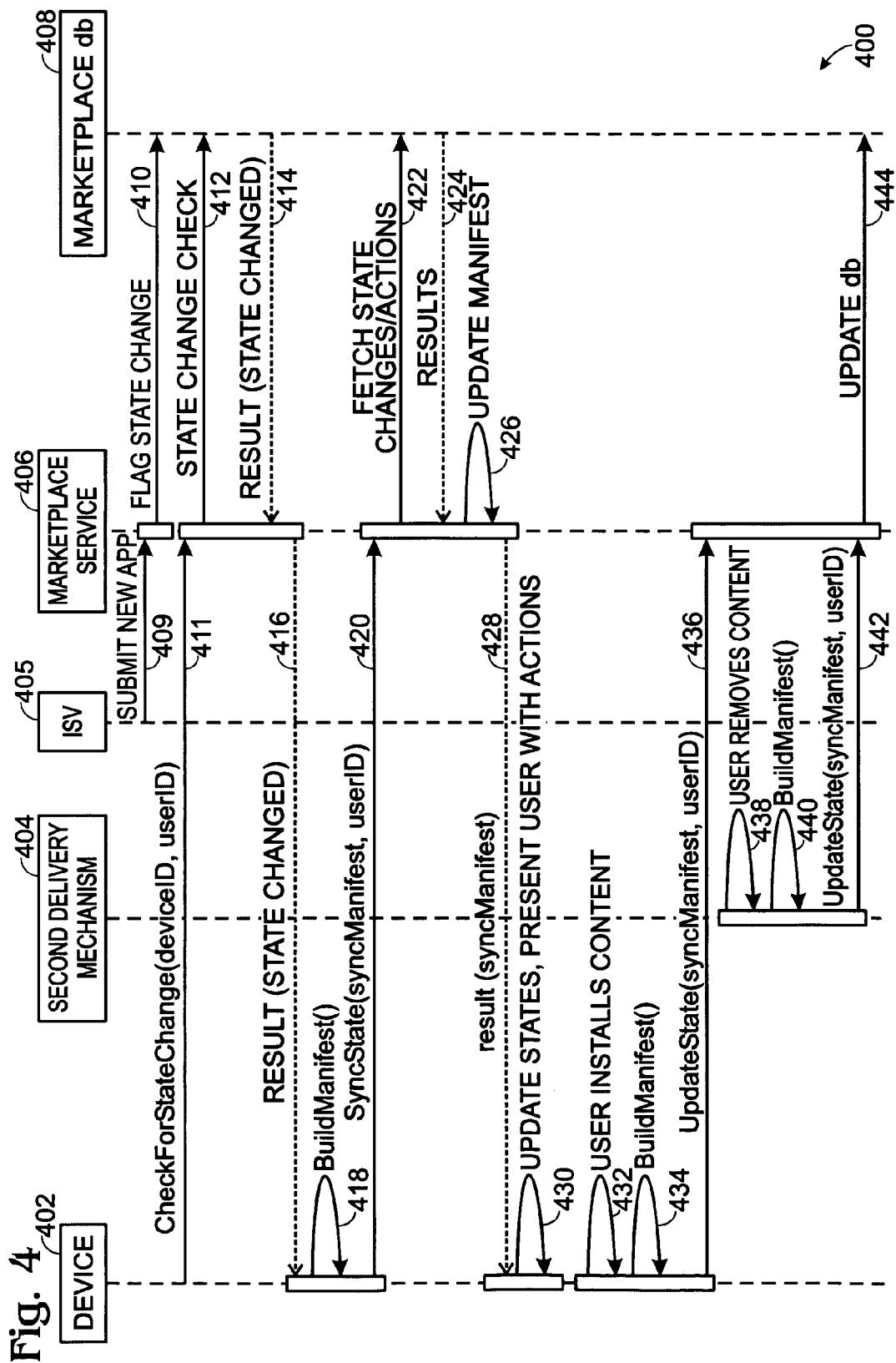

SYNCHRONIZATION OF MOBILE DEVICE WITH APPLICATION SERVER

BACKGROUND

Various mobile devices, including but not limited to smart phones, netbooks, other notebook computers, personal media players, and the like, may be configured to allow a user to install and run various applications such as games, utilities, etc. Such applications may be provided by a mobile service provider, mobile device manufacturer, mobile device software manufacturer, and/or third party, via an application server that acts as an "application store" from which users can download applications, sometimes for a fee.

In some environments, the provision of applications for mobile device may be restricted by a mobile device manufacturer or mobile operator. In such environments, users may be able to obtain applications from a single source, such as an application server managed by a mobile device manufacturer, via a single channel, such as a desktop client running on a computer to which the mobile device is connected, for example, via a tether, wireless connection, etc. In such use environments, synchronization of a state of the mobile device with a state of the application server may be relatively straightforward due to the narrowness and constraints of the mobile application use environment and distribution channel.

SUMMARY

Accordingly, various embodiments are disclosed herein that are related to synchronizing a state of a mobile device stored on a mobile device application server with a state stored on the mobile device. For example, one disclosed embodiment provides, in a mobile device application server, a method of synchronizing a state on a mobile device and the mobile device application server. The method comprises receiving a state change at the mobile device application server that changes a state relative to a state stored on one or more mobile devices, and in response, storing the state change. The method further comprises receiving a request from a mobile device for information regarding any state changes that have occurred, sending a response to the mobile device notifying the mobile device of the state change, and then receiving from the mobile device an application manifest that comprises a current state of the mobile device. Upon receiving the application manifest, the method comprises updating the application manifest to form an updated application manifest that reflects the state change, and sending the updated application manifest to the mobile device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 shows an embodiment of an example mobile device use environment.

FIG. 2 shows an embodiment of a method of synchronizing a state of a mobile device application server with a state of a mobile device.

FIG. 3 shows an embodiment of a method of synchronizing a state of a mobile device with a state of a mobile device application server.

FIG. 4 shows a sequence diagram that depicts another embodiment of a method of synchronizing a state of a mobile device application server with a state of a mobile device.

DETAILED DESCRIPTION

Embodiments are disclosed herein that relate to synchronizing a state of a mobile device with a state of a mobile device application server that enable such synchronization even where state changes may be made via multiple channels and/or by multiple parties. It will be understood that the term "mobile device" as used herein may include any suitable mobile device, including but not limited to, smart phones and other cellular phones, notebook computers such as so-called "netbooks", portable media players, personal digital assistants, etc. Further, the term "mobile device application server" may include any server configured to provide applications to mobile devices over any suitable communications channel.

Before discussing the synchronization of a state of a mobile device stored on the mobile device with a state of the device stored on a mobile device application server, an example embodiment of a mobile device use environment 100 is described with reference to FIG. 1. Mobile device use environment 100 comprises a plurality n of mobile devices (depicted as three mobile device 102 (mobile device 1), 104 (mobile device 2), and 106 (mobile device n)) that are in communication with a plurality m of mobile networks, depicted as two example mobile networks 108 (network 1) and 109 (network m). Via mobile networks, 108 and 109, mobile devices 102, 104, 106 may communicate with each other in various ways, including but not limited to via voice data, instant messaging, email, etc. In the depicted embodiment, three mobile devices communicating with two mobile networks are shown for the purpose of example, but it will be understood that any suitable number of mobile devices may be in communication with any suitable number of mobile networks. Generally, each mobile device will communicate preferentially with a primary mobile network associated with a mobile operator with whom a user has a billing account associated with the device, but may connect to other mobile networks if the primary mobile network is not connectable (e.g. out-of-range), as indicated by the dashed-line connection of mobile device 104 to mobile network 109.

Each mobile device comprises memory 110 configured to store computer-readable instructions such as applications and other programs, and a processor 112 configured to execute the applications and other programs stored in memory 110. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

Mobile devices 102, 104, 106 also may be in communication with a TCP/IP data network, such as a WAN 114, as another channel of communication. For example, as depicted in FIG. 1, mobile device n 106 may be configured to connect to a WAN such as the Internet via a wireless protocol such as 802.11a, 802.11b, 802.11g, 802.11n, or any other suitable protocol.

Mobile devices 102, 104 and 106 may communicate with a mobile device application server 116 via the mobile networks 108 and 109 and/or WAN 114. Application server 116 further may be in communication with one or more databases, represented by database 118 in FIG. 1, that store mobile device applications and various items of data related to the provision of applications to mobile devices. For example, as depicted in FIG. 1, the database 118 may comprise application data 120. Such application data 120 may include binary (or other type) application files that are downloadable by mobile devices 102, 104, and 106, and metadata related to the application files that allow users of mobile devices 102, 104 and 106 to use search queries to locate desired applications that are compatible with the users' mobile devices. It will be understood that the application data 120 may contain applications provided by multiple developers for multiple different types and brands of mobile devices, each of which may run different operating systems and/or different versions of like operating systems. As such, the metadata that is stored as application data 120 may comprise information regarding the device type, operating system, operating system version, and mobile operator identity for which a particular application is intended for use. The application metadata also may include information regarding the cost of the application, any promotional pricing changes or the like to be applied to the application, information regarding the geographic markets and end-user language for which the application is intended, editorial content such as media and consumer reviews of an application, any mobile operator-specific business policies that are to be applied to the purchase and/or use of an application, and/or any other suitable type of metadata related to applications stored in the database 118.

Database 118 also may store user data 122. The user data 122 may include data related to individual users, including but not limited to a user's identity, account number, credit card/debit card/other preferred payment mechanism, type of mobile device used by each user, geographic location of each user, language preferences of each user, etc. This data may allow applications that are incompatible with a user's mobile device, geographic location, language, etc. to be filtered from a database query for applications.

Continuing with FIG. 1, the mobile device application server 116 comprises memory 124 configured to store computer readable instructions executable by a processor 126 and/or other logic components to perform the various tasks in the course of managing the provision of applications to mobile devices. For example, such instructions may be executable to communicate with mobile devices 102, 104, and 106 over the mobile network 108 and WAN 114, to communicate with the database 118 to execute search queries and communicate search results to the mobile devices 102, 104 and 106, and to perform various other functions and operations, including but not limited to those described herein.

The mobile device application server 116 also may be configured to provide applications to mobile devices via other communication channels. For example, as depicted in FIG. 1, a mobile device 106 may be configured to be connected (via a tether, wireless connection, etc.) to a computing device 128, such as a laptop or desktop computer, to allow communication with the application server 116 via the computing device 128. Such communication may take place via a desktop client 130 installed on the computing device 128, via a network-based client 131 ("web-based client) on mobile device application server 116 and accessible via an Internet browser application 132, or in any other suitable manner. Where a mobile device 106 communicates with the mobile device application server 116 via a desktop client 130, a state of the mobile device may be stored and updated on the desktop client 130. Likewise, where the mobile device 106 communicates with the mobile device application server 116 via a web-based client 131 accessed by browser 132, the state of the mobile device may be updated on the mobile device application server 116. It will be understood that such a browser also may be run directly on mobile devices 102, 104, 106.

End-users of the mobile devices 102, 104 and 106 also may be able to load applications onto a mobile device in ways other than during a communication session with the application server 116. For example, a removable media storage device, such as a flash memory drive or the like, may be used to side load an application onto a mobile device. In FIG. 1, example side load scenarios are depicted as a removable storage medium 133 coupled to mobile device 104, and also a removable storage media receptacle/connector 135 provided on computing device 128.

Continuing with FIG. 1, mobile operators may be able to interact with the mobile device application server 116 via a mobile operator management console. A plurality x of mobile operator management consoles are shown as two example consoles 134, 136, but it will be understood that any suitable number of mobile operators may be in communication with the mobile device application server 116 via any suitable number of management consoles. The mobile operator management console may allow a mobile operator to submit new applications for inclusion in the database 118, to submit updates and new versions to existing applications, to submit promotions for applications, to modify pricing, business rules, and other information related to specific applications, to revoke applications, and to take any other suitable action related to programs submitted by a mobile operator and/or configured to be operated on devices that access the mobile operator's network.

Various other parties besides a mobile operator also may be able to submit applications, and control various aspects of previously-submitted programs, on the mobile device application server 116. For example, some programs may be provided by third-party software developers, either affiliated with or not affiliated with a specific mobile operator. Such developers may submit applications, updates, revocations, for inclusion on the mobile device application server 116 via a developer console 138 that may be provided, for example, as a part of a software development kit provided by the operator of the mobile device application server 116, by a mobile operator, etc. Likewise, applications, updates, revocations, etc. from a third-party developer may be submitted either through a mobile operator, or directly to the application server 116, via WAN 114 or other suitable communication channel. A single developer console is shown for the purpose of example, but it will be understood that any suitable number of developers may communicate with the application server 116 via development consoles.

It will be understood that mobile device use environment embodiment 100 depicted in FIG. 1 is shown for the purpose of example, and is not intended to be limiting in any manner.

Unlike mobile device use environments in which applications for a single type of device operated on a single mobile operator's mobile network are obtained through a single channel (e.g. a desktop client), the depicted mobile device use environment 100 allows a mobile device user to obtain applications from many different sources, for many different devices operated by many different mobile operators, via many different channels. For example, a user may obtain applications over the air (OTA) via a mobile network operated; via a WAN such as the Internet accessed by a desktop client or a web browser; via side loads, either by connecting a removable media directly to a mobile device or by a removable media connected to a computing device to which the mobile device is connected; and/or via any other suitable channel.

Due to the many different ways a user may obtain applications from the mobile device application server 116, maintaining a current state of each of mobile device 102, 104, 106 at the mobile device application server 116 may pose various challenges. Further, this also may lead to challenges in communicating state changes that occur at mobile device application server 116 to a mobile device, given the number of different ways that a mobile device 102, 104, 106 may access the mobile device server.

Accordingly, FIG. 2 shows an embodiment of a method 200 of synchronizing a state of a mobile device application server with a state of a mobile device that facilitates propagating state changes within a use environment such as that depicted in the embodiment of FIG. 1. Method 200 comprises, at 202, receiving a state change at a mobile device application server. The state change may be received from any suitable entity. For example, as shown in FIG. 2, the state change may be received from an application provider 204 such as a developer, from a mobile operator 206, from a system administrator 208 of the application server, etc.

Upon receipt, the state change is stored, as indicated at 210. The state change may comprise any suitable state change for which synchronization may be performed. For example, a state change may comprise a new application 212 added to the mobile device application server that is available to mobile devices, a revocation 214 of an existing application, a new version of an existing application 216, etc. Further, a state change also may represent a change of a state that is server—specific, e.g. related to a control parameter of a mobile device, rather than to a specific application stored on the mobile device. For example, as indicated at 218, the state change may represent a new mobile device setting, such as a setting that controls a frequency at which the mobile device checks for changes of state at the mobile device application server ("synchronization frequency").

Continuing with FIG. 2, method 200 next comprises, at 220, receiving a request from a mobile device regarding whether any state changes have occurred, and then, at 222, sending a response to the mobile device regarding the state change that has occurred. Processes 220 and 222 may occur over a mobile voice network, over a WAN such as the Internet, or via any other suitable communications channel.

Next, method 200 comprises, at 224, receiving from the mobile device an application manifest that contains information regarding the applications currently stored on the mobile device. For example, the application manifest may contain a user and/or device identification, an identification of each application stored on the mobile device (currently, as well as formerly in some embodiments), as well as various items of information regarding each application, such as a status of the application (i.e. version number, revocation status, etc.), dates on which each application were installed/uninstalled/modified, etc. It will be understood that these types of information are set forth for the purpose of example, and are not intended to be limiting in any manner.

The application manifest received at 224 from the mobile device may have any suitable format. In one specific embodiment, the manifest comprises an XML (eXtensible Markup Language) document in which the above-described information is contained. An example of an embodiment of an XML application manifest is described in more detail below.

Continuing with FIG. 2, method 200 next comprises, at 226, fetching state change information from a database. The state change information may be fetched, for example, by querying the database with information regarding the mobile device type, mobile device ID, application information obtained from the application manifest, etc. to locate state change information relevant to the particular mobile device. Then, an updated application manifest is formed at 228 with the state change information, and is sent to the mobile device at 230. The mobile device may then use the updated application manifest to take any appropriate actions based upon the information in the updated application manifest, such as revoking an application, installing an updated version of an application, etc.

The updated application manifest may have any suitable form. For example, in one embodiment, the updated application manifest comprises an XML document that contains the information in the application manifest received from the mobile device, with modifications to reflect any state change information relevant to those applications. Further, the updated application manifest also may include information regarding new applications that have been made available to the mobile device, and/or server-specific state changes, such as control settings. An example of an updated XML manifest is shown below, where the updated manifest contains three application elements, two of which illustrate the inclusion of state change information included as values of attributes of the application elements.

```
<?xml version="1.0" encoding="utf-8"?>
<appManifest dateTime="">
    <Device id="" type="" lastConnect="">
    <application id="" hash="" state="" path=""
installDate="" uninstallDate="" action="revoke">
<Description> Description>
<Error></Error>
    </application>
    <application id="" hash="" state="" path=""
installDate="" uninstallDate="" action="update">
<Description> Description>
    </application>
    <application id="" hash="" state="" path=""
installDate="" uninstallDate="" action=""></application>
    <Notification>
        <ServerError>
            <Error>0x65400987</Error>
            <Description>Server is busy</Description>
        </ServerError>
        <SetSyncInterval inhours="24" />
    </Notification>
    </Device>
</appManifest>
```

In the depicted updated manifest embodiment, the "action" attribute in the first application element has a value of "revoke", indicating to the mobile device that the identified application is to be revoked. Likewise, the second application element has an "action" attribute with a value of "update", indicating to the mobile device that an update is available to the identified application.

The mobile device may be configured to read the updated application manifest and take appropriate actions based upon the state changes contained in the updated manifest, such as revoking an application or prompting a user to agree to the installation of a new version of an application. It can also be seen that the updated manifest comprises an element for setting a synchronization frequency ("<SetSyncInterval inhours="24"/>), which may be updated by the mobile application server by changing the value of the "inhours" attribute. It will be understood that the depicted updated application manifest is shown for the purpose of example, and is not intended to be limiting in any manner.

FIG. 3 shows an embodiment of a method 300 of synchronizing a state on a mobile device with a state on a mobile device application server, shown from the perspective of a mobile device. Method 300 first comprises, at 302, sending a request to the mobile device application server for information regarding any state changes that have occurred at the mobile device application server. Next, at 304, method 300 comprises receiving a response from the server that comprises information regarding any state changes that have occurred.

If it is determined at 306 that the response shows that no state changes have occurred, then method 300 may end until a next synchronization takes place. On the other hand, if it is determined that 306 that one or more state changes have occurred, then method 300 comprises building an application manifest at 308, and then sending the application manifest to the mobile device application server at 310. As described above, the application manifest may comprise identities of all of the applications that are stored on the mobile device. The application manifest also may store other information, such a list of applications that have previously been installed but have been removed from the mobile device due to revocation, as well as various items of information about saved and/or revoked applications, such as a date of installation, date of revocation, version, etc. In some embodiments, the application manifest may comprise an XML document, while in other embodiments, the application manifest may take any other suitable form.

After sending the application manifest to the mobile device application server, method 300 next comprises receiving an updated application manifest from the server. As described above in the context of FIG. 2, the updated application manifest contains the information in the application manifest sent from the mobile device, with modifications made to that information to reflect any state change information relevant to those applications. Further, the updated application manifest also may include information regarding new applications that have been made available to the mobile device, as well as changes to a server state (i.e. changes to synchronization frequency and the like).

Upon receipt of the updated application manifest from the mobile device server, method 300 next comprises, at 314, updating a current state of the mobile device according to the information contained in the updated application manifest, which may comprise taking actions. For example, if the updated application manifest comprises a "revoke" action for an application, the mobile device may revoke the application, either by marking it as revoked in memory or by removing it from memory altogether. Likewise, if the updated application manifest comprises an "update" instruction, the mobile device may either automatically obtain the update from the mobile device application server (if the update is mandatory), or may prompt a user to alert the user of the availability of the update and then present the user the option of installing the updated version of the application. Further, the updated application manifest also may comprise information regarding any new applications that are available for the mobile device, based upon the device's identity, mobile operator, geographic location, language preferences, operating system, etc. In this case, the user may be presented with the option of installing a newly available application. The updated manifest also may comprise a new server setting to be applied, such as a new synchronization frequency. It will be understood that the above-described changes of state are presented for the purpose of example, and are not intended to be limiting in any manner.

FIG. 4 shows a sequence diagram 400 representing an embodiment of a method of synchronizing a state of a mobile device and a state of a mobile device application server that demonstrates how such a synchronization may occur if three (or more) delivery mechanisms for acquiring applications from a mobile device application server. Specifically, FIG. 4 shows events that occur at a client on a mobile device 402, at a client on a second delivery mechanism 404, at an independent software vendor (ISV) 405, at a mobile device application server 406 (shown as "marketplace service"), and at a database 408 (shown as "marketplace database"). The second delivery mechanism may comprise, for example, a desktop client running on a computing device to which the mobile device is in communication (for example, via a tether, wireless connection, etc.), a web-based client running on a browser on such a computing device, etc. FIG. 4 also shows a third delivery mechanism as a side-load of an application onto the mobile device 402, as described below.

FIG. 4 starts with the ISV provisioning, at 409, a new application for the application server. The new application is added to the application server, and a state change due to the new application is flagged at 410. It will be understood that such a state change may occur when an ISV or other entity submits a new application version, a revocation request, and/or takes any other suitable action. Next, mobile device 402 sends a request 410 to the mobile device application server 406 to check for a state change. This request may include a device ID and a user ID of the mobile device to aid in the database search for state changes. This request may be sent, for example, to an API (application programming interface) on the mobile device application server 406 that performs the synch routines. Upon receipt of the request 410, the mobile device application server 406 queries, at 412, the database 408 to check for any state changes that have occurred that are relevant to the mobile device 402. If a state change has occurred, then the database 408 returns a result 414 showing that a state has changed, and this result is sent to the mobile device 402 via a response 416.

Upon receiving the response from the mobile device application server 406 confirming that a state change has occurred, the mobile device 402 builds an application manifest 418, and then sends the application manifest to the mobile device application server at 420 as a message requesting a synchronization of state.

Upon receipt of the application manifest from the mobile device, the mobile device application server fetches, at 422, the state changes from the database 408, where the state change may include various actions to be performed by the mobile device. The state changes are then returned at 424 to the mobile device server 406, which builds an updated manifest at 426 and sends, at 428, the updated manifest to the mobile device 402. The mobile device then may update states at 430, which may include presenting the user with actions (such as selecting to install new applications or application versions, etc.).

Continuing with FIG. 4, a user may install new content on the mobile device 402 via a side load, such as from a memory device, from a computing device, etc. This is shown at 432 in FIG. 4. To inform the server of the new state of the mobile device, the mobile device 402 may be configured to build another application manifest, at 434, upon the subsequent state change caused by the installation of new application content via a side load, and then to send, at 436, the updated manifest to the mobile device application server 406. Information included in this request may include, for example, a user ID in addition to the application manifest. This information may then be used by the mobile device application server 406 to update the database, as shown at 444.

FIG. 4 also illustrates the removal of an application from the mobile device via the second delivery mechanism 404. First, at 438, a user removes content from the mobile device via the second delivery mechanism. Upon this change in state, the mobile device (or the second delivery mechanism, e.g. a desktop client or web-based client) then constructs, at 440, another application manifest that captures the state of the mobile device after the subsequent state change caused by the removal of the application, and then sends the manifest to the mobile device application server 406 at 442. Then, the mobile device application server 406 updates the state at the database 444, thereby completing the synchronization.

In this manner, state changes made by various parties (mobile device user, mobile device operator, server administrator, third-party developers, etc.) via various channels (mobile device client, desktop client, web-based client, side load, management consoles, etc.) may propagate through the use environment, irrespective of where the state originated. Further, in this manner, a user may be ensured the user has an accurate representation of content available to that particular user, and that available actions are presented and are appropriate. Additionally, the disclosed methods may work with third-party supplied applications without any specific development hooks or API usage.

It will be understood that the configurations and/or approaches described herein for synchronizing states in a mobile device use environment are presented for the purpose of example and not intended to be limiting, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. In a mobile device application server, a method of synchronizing a state on a mobile device and a state on the mobile device application server, the method comprising:
   receiving a state change at the mobile device application server, the state change comprising one or more of a new version of an application stored on the mobile device, a revocation of an application stored on the mobile device, a new application available for the mobile device, and a change in a server setting;
   storing the state change;
   receiving a request from the mobile device for information regarding any state changes that have occurred;
   sending a response to the mobile device notifying the mobile device of the state change;
   receiving from the mobile device an application manifest comprising an identity and a status of each application stored on the mobile device;
   updating the application manifest at the mobile device application server to form an updated application manifest that is different from the application manifest as received from the mobile device and reflects the state change; and
   sending the updated application manifest to the mobile device.

2. The method of claim 1, wherein the application manifest comprises an XML document.

3. The method of claim 1, wherein the updated application manifest comprises an action to be performed by the mobile device to implement the state change for a selected application and not to be performed for another application.

4. The method of claim 1, further comprising receiving another application manifest from the mobile device with information regarding a subsequent state change made on the mobile device.

5. The method of claim 1, further comprising receiving another application manifest from a network-based client regarding a subsequent state change made on the mobile device via the network-based client.

6. The method of claim 1, further comprising receiving another application manifest from a desktop client on a computing device to which the mobile device is connected.

7. A mobile device configured to run applications obtained from a mobile device application server, the mobile device comprising:
   a processor; and
   memory comprising instructions stored thereon that are executable by the processor to synchronize a state of the mobile device with respect to one or more applications stored on the mobile device with a state stored on a mobile device application server by:
      sending a request to the mobile device application server for information regarding any state changes that have occurred that are related to applications installed on one or more of the mobile device and a computing device associated with the mobile device;
      receiving information from the mobile device application server regarding any state changes;
      if the information received from the mobile device application server indicates that a state change has occurred, then building an application manifest to send to the mobile device application server, wherein the application manifest gives a current state of the mobile device comprising identities of applications stored on the mobile device;
      sending the application manifest to the mobile device application server;
      receiving an updated application manifest from the mobile device application server that is different from the application manifest sent to the mobile device application server and that reflects the state change; and
      updating the current state of the mobile device according to the updated application manifest.

8. The device of claim 7, wherein updating the current state of the mobile device comprises one or more of saving a new version of a mobile device application on the mobile device, revoking an application from the mobile device, installing a new application on the mobile device, and updating a synchronization frequency on the mobile device.

9. The device of claim 7, further comprising receiving another state change via a side load of an application onto the mobile device, and in response, sending another application manifest to the mobile device application server.

10. The device of claim 7, further comprising receiving new content via a desktop client on a computing device to which the mobile device is connected, and in response, sending another application manifest to the mobile device server.

11. The device of claim 7, further comprising receiving new content via a web-based client, and in response, sending another application manifest to the mobile device server.

12. The device of claim 7, further comprising receiving new content via a side load from a removable media device, and in response, sending another application manifest to the mobile device server.

13. In a mobile device application server, a method of synchronizing a current state on a mobile device with a state of the mobile device stored on the mobile device application server, the method comprising:

receiving a state change, wherein the state change comprises one or more of a new application available to mobile devices, an updated version of an application available to mobile devices, a revocation of an application previously made available to mobile devices, and a change in a server setting;

storing the state change in a database;

receiving a request from a mobile device for information regarding any state changes that have occurred that are related to applications installed on the mobile device;

sending a response to the mobile device notifying the mobile device of the state change;

receiving from the mobile device an XML application manifest that comprises a list of identities of applications stored on the mobile device and also a status of each application stored on the mobile device;

fetching information related to the first state change from the database;

updating the XML application manifest at the mobile device application server to form an updated application manifest that is different from the XML application manifest as received from the mobile device and that reflects the state change;

sending the updated application manifest to the mobile device;

receiving another application manifest from the mobile device that comprises a subsequent state change; and updating the database to reflect the subsequent state change.

14. The method of claim 13, wherein receiving the other application manifest comprises receiving the other application manifest from the mobile device.

15. The method of claim 13, wherein receiving the other application manifest comprises receiving the other application manifest from a web-based client.

16. The method of claim 13, wherein receiving the other application manifest comprises receiving the other application manifest from a desktop client on a computing device.

17. The method of claim 13, wherein the receiving a state change comprises receiving a state change from one or more of a system administrator, a mobile operator, and a third-party application developer.

18. The method of claim 13, wherein the change in a server setting comprises a change in a synchronization frequency.

* * * * *